United States Patent
Hirschfeld et al.

(10) Patent No.: US 7,257,584 B2
(45) Date of Patent: Aug. 14, 2007

(54) SERVER FILE MANAGEMENT

(75) Inventors: Robert A. Hirschfeld, Austin, TX (US); C. Evan Pollan, Austin, TX (US); Dave D. McCrory, Austin, TX (US)

(73) Assignee: Surgient, Inc., Austin, TX (US)

( * ) Notice: Subject to any disclaimer, the term of this patent is extended or adjusted under 35 U.S.C. 154(b) by 485 days.

(21) Appl. No.: 10/844,924

(22) Filed: May 13, 2004

(65) Prior Publication Data

US 2004/0210591 A1 Oct. 21, 2004

Related U.S. Application Data

(63) Continuation-in-part of application No. 10/202,754, filed on Jul. 25, 2002, now Pat. No. 6,990,666, which is a continuation-in-part of application No. 10/124,195, filed on Apr. 17, 2002, which is a continuation-in-part of application No. 10/100,216, filed on Mar. 18, 2002, now Pat. No. 6,880,002.

(51) Int. Cl.
*G06F 17/30* (2006.01)

(52) U.S. Cl. .................. 707/10; 709/217; 709/212

(58) Field of Classification Search .................. 707/2, 707/10, 205; 709/212, 217
See application file for complete search history.

(56) References Cited

U.S. PATENT DOCUMENTS

| | | | |
|---|---|---|---|
| 4,912,628 A | 3/1990 | Briggs | |
| 5,062,037 A | 10/1991 | Shorter et al. | |
| 5,201,049 A | 4/1993 | Shorter | |
| 5,611,050 A | 3/1997 | Theimer et al. | |
| 5,802,290 A | 9/1998 | Casselman | |
| 5,805,824 A * | 9/1998 | Kappe | 709/242 |
| 5,996,026 A | 11/1999 | Onodera et al. | |
| 5,999,518 A | 12/1999 | Nattkemper et al. | |
| 6,003,050 A | 12/1999 | Silver et al. | |
| 6,038,566 A * | 3/2000 | Tsai | 707/102 |
| 6,041,347 A | 3/2000 | Harsham et al. | |
| 6,067,545 A | 5/2000 | Wolff | |
| 6,075,938 A | 6/2000 | Bugnion et al. | |
| 6,104,699 A | 8/2000 | Holender et al. | |
| 6,185,601 B1 | 2/2001 | Wolff | |
| 6,256,637 B1 | 7/2001 | Venkatesh et al. | |

(Continued)

OTHER PUBLICATIONS

Henry Baltazar, Virtual Storage Age, eWEEK, pp. 45 and 48, Aug. 27, 2001, Ziff Davis Media Inc., New York, New York.

(Continued)

*Primary Examiner*—John Cottingham
*Assistant Examiner*—Mariela D Reyes
(74) *Attorney, Agent, or Firm*—Gary R. Stanford

(57) ABSTRACT

A virtual hard drive (VHD) file manager system for a virtualized logical server cloud including a master repository and a VHD file manager. The VHD interfaces virtualization software and a server cloud manager to manage VHDs for logical servers of the server cloud. The master repository stores multiple master component files associated with the stored VHDs. The master component files include at least one core file and at least one delta file. The VHD file manager enables copying of the master component files to deploy VHDs in the server cloud, manages creation and storing of new delta files and corresponding VHDs in the master repository, and generates and maintains meta information to maintain file relationship integrity.

38 Claims, 9 Drawing Sheets

U.S. PATENT DOCUMENTS

| | | |
|---|---|---|
| 6,263,358 B1 | 7/2001 | Lee et al. |
| 6,272,523 B1 | 8/2001 | Factor |
| 6,272,537 B1 | 8/2001 | Kekic et al. |
| 6,370,560 B1 | 4/2002 | Robertazzi et al. |
| 6,496,847 B1 | 12/2002 | Bugnion et al. |
| 6,567,839 B1 | 5/2003 | Borkenhagen et al. |
| 6,633,916 B2 | 10/2003 | Kauffman |
| 6,640,239 B1 | 10/2003 | Gidwani |
| 2002/0065864 A1 | 5/2002 | Hartsell et al. |
| 2002/0129082 A1 | 9/2002 | Baskey et al. |
| 2002/0184642 A1* | 12/2002 | Lude et al. ................. 725/105 |
| 2003/0005166 A1* | 1/2003 | Seidman ..................... 709/310 |
| 2004/0243650 A1* | 12/2004 | McCrory et al. ........... 707/203 |
| 2005/0229175 A1* | 10/2005 | McCrory et al. ........... 717/177 |

OTHER PUBLICATIONS

Michael Vizard, Automated help is on the horizon, InfoWorld, Mar. 1, 2002, InfoWorld Media Group, San Francisco, CA.

* cited by examiner

SERVER FILE MANAGEMENT

CROSS-REFERENCE TO RELATED APPLICATION(S)

The present application is a Continuation-In-Part of U.S. Patent Application entitled "Near On-Line Servers", Ser. No. 10/202,754, filed Jul. 25, 2002, now U.S. Pat. No. 6,990,666 which itself is a Continuation-In-Part of U.S. Patent Application entitled "Virtual Server Cloud Interfacing", Ser. No. 10/124,195, filed Apr. 17, 2002, which itself is a Continuation-In-Part of U.S. Patent Application entitled "Virtualized Logical Server Cloud", Ser. No. 10/100,216, filed Mar. 18, 2002, now U.S. Pat. No. 6,880,002 all hereby incorporated by reference in their entireties.

BACKGROUND OF THE INVENTION

1. Field of the Invention

The present invention relates to virtualization server technology, and more particularly to managing virtual hard drives (VHDs) of logical servers and corresponding VHD component files.

2. Description of the Related Art

There are many situations in which it is desired to lease one or more server computer systems on a short or long-term basis. Examples include educational or classroom services, demonstration of software to potential users or buyers, website server applications, etc. The servers may be pre-configured with selected operating systems and application software as desired. Although physical servers may be leased and physically delivered for onsite use, servers may also be leased from a central or remote location and accessed via an intermediate network system, such as the Internet. The primary considerations for remote access include the capabilities of the remote access software and the network connection or interface.

Virtualization technology enabled multiple logical servers to operate on a single physical computer. Previously, logical servers were tied directly to physical servers because they relied on the physical server's attributes and resources for their identity. Virtualization technology weakened this restriction by allowing multiple logical servers to override a physical server's attributes and share its resources. Each logical server is operated substantially independent of other logical servers and provides virtual isolation among users effectively partitioning a physical server into multiple logical servers.

A prior disclosure introduced virtualization that enabled complete separation between logical and physical servers so that a logical server may exist independent of a specific physical server. The logical server cloud virtualization added a layer of abstraction and redirection between logical and physical servers. Logical servers were implemented to exist as logical entities that were decoupled from physical server resources that instantiated the logical server. Decoupling meant that the logical attributes of a logical server were non-deterministically allocated to physical resources, thereby effectively creating a cloud of logical servers over one or more physical servers. The prior disclosure described a new deployment architecture which applied theoretical treatment of servers as logical resources in order to create a logical server cloud. Complete logical separation was facilitated by the addition of the SCM, which is an automated multi-server management layer. A fundamental aspect to a logical server cloud is that the user does not have to know or provide any physical server information to access one or more logical server(s), since this information is maintained within the SCM. Each logical server is substantially accessed in the same manner regardless of underlying physical servers. The user experiences no change in access approach even when a logical server is reallocated to a different physical server. Any such reallocation can be completely transparent to the user.

A second prior disclosure built upon logical server cloud virtualization by adding a layer of abstraction and redirection between logical servers and the server clouds as managed and controlled by corresponding SCMs. The server cloud was accessed via its SCM by a user via a user interface for accessing logical and physical servers and by the logical and physical servers themselves, such as via logical and/or physical agents as previously described. SCMs interfaced each other according to predetermined relationships or protocols, such as "peer" SCMs or server clouds or between a server cloud and a "super peer", otherwise referred to as an "Exchange". The second disclosure introduced the concept of a "subcloud" in which an SCM interfaced or communicated with one or more logical and/or physical servers of another server cloud. The SCM of the server cloud operated as an intermediary or proxy for enabling communication between a logical server deployed within a remote cloud. Logical servers could be moved from one server cloud to another or replicated between clouds. A remote SCM could manage one or more logical servers in a subcloud of a remote server cloud. In fact, a logical server might not be aware that it was in a remote cloud and may have behaved as though it resided in the same cloud as the SCM managing its operations. The proxy functionality enabled transparency between users and logical servers. The user of a logical server may or may not be aware of where the logical server existed or in which server cloud it is instantiated.

Many advantages and capabilities were enabled with cloud to cloud interfacing. Routing, switching, replication and cloud balancing may be performed intercloud, such as between "trusted" clouds, extracloud, such as between "untrusted" clouds, or via an intermediary (e.g., super-peer, supercloud, shared storage, exchange) in which actions requested of one SCM were transparently performed by a different SCM. An exchange cloud could be established that had predetermined commercial relationships with other clouds or that was capable of querying public or otherwise accessible clouds for resource information. Such an exchange cloud could be established on a commercial basis, for example, to provide a free market exchange for servers or services related thereto. Exchange clouds included intercloud proxy and predetermined business rules and relationships to conduct commercial transactions. Such commercial transactions might include, for example, sale or lease of logical servers on the market through a common exchange and medium, such as the Internet.

Multiple logical servers may be defined and use of logical servers may facilitate creation of additional logical servers based on usage. Each logical server may be represented as a series of components, where each component may further be represented as a chain of one or more files. The integrity of each server is integrally linked to the integrity of the chain of files used to comprise the server. Modification to any parent file in any chain effectively eliminates the validity of subsequent files or file sets. A significant challenge exists to manage server component files in a system comprising multiple logical servers with many possible combinations of file relationships between component files.

BRIEF DESCRIPTION OF THE DRAWING(S)

The benefits, features, and advantages of the present invention will become better understood with regard to the following description, and accompanying drawing in which.

DETAILED DESCRIPTION

Figure 1:
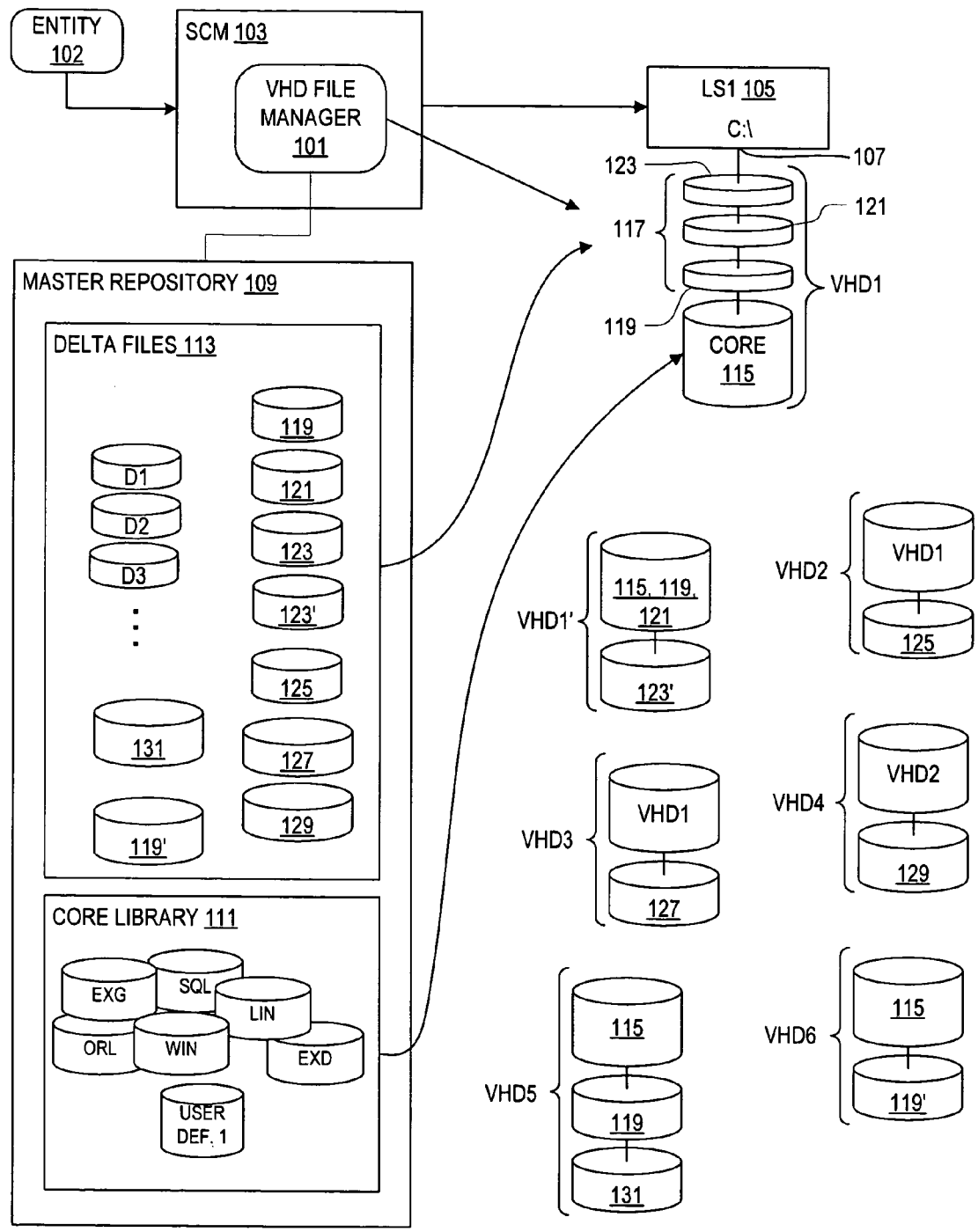
FIG. 1 is a figurative block diagram illustrating retrieval and assembly of a virtual hard drive (VHD), shown as VHD1, for a logical server (LS) employing an exemplary VHD file manager implemented according to an embodiment of the present invention.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The following definitions are provided for this disclosure with the intent of providing a common lexicon. A "physical" device is a material resource such as a server, network switch, or disk drive. Even though physical devices are discrete resources, they are not inherently unique. For example, random access memory (RAM) devices and a central processing unit (CPU) in a physical server may be interchangeable between like physical devices. Also, network switches may be easily exchanged with minimal impact. A "logical" device is a representation of a physical device to make it unique and distinct from other physical devices. For example, every network interface has a unique media access control (MAC) address. A MAC address is the logical unique identifier of a physical network interface card (NIC). A "traditional" device is a combined logical and physical device in which the logical device provides the entire identity of a physical device. For example, a physical NIC has its MAC address permanently affixed so the physical device is inextricably tied to the logical device.

A "virtualized" device breaks the traditional interdependence between physical and logical devices. Virtualization allows logical devices to exist as an abstraction without being directly tied to a specific physical device. Simple virtualization can be achieved using logical names instead of physical identifiers. For example, using an Internet Uniform Resource Locator (URL) instead of a server's MAC address for network identification effectively virtualizes the target server. Complex virtualization separates physical device dependencies from the logical device. For example, a virtualized NIC could have an assigned MAC address that exists independently of the physical resources managing the NIC network traffic.

A "server cloud" or "cloud" is a collection of logical devices which may or may not include underlying physical servers. The essential element of a cloud is that all logical devices in the cloud may be accessed without any knowledge or with limited knowledge of the underlying physical devices within the cloud. Fundamentally, a cloud has persistent logical resources, but is non-deterministic in its use of physical resources. For example, the Internet may be viewed as a cloud because two computers using logical names can reliably communicate even though the physical network is constantly changing.

A "virtualized logical server cloud" refers to a logical server cloud comprising multiple logical servers, where each logical server is linked to one of a bank of physical servers. The boundary of the logical server cloud is defined by the physical resources controlled by a "cloud management infrastructure" or a "server cloud manager" or SCM. The server cloud manager has the authority to allocate physical resources to maintain the logical server cloud; consequently, the logical server cloud does not exceed the scope of physical resources under management control. Specifically, the physical servers controlled by the SCM determine a logical server cloud's boundary. "Agents" are resource managers that act under the direction of the SCM. An agent's authority is limited in scope and it is typically task-specific. For example, a physical server agent (PSA) is defined to have the authority to allocate physical resources to logical servers, but does not have the authority or capability to create administrative accounts on a logical server. An agent generally works to service requests from the server cloud manager and does not instigate actions for itself or on other agents.

FIG. 1 is a figurative block diagram illustrating deployment of a virtual hard drive (VHD), shown as VHD1, for a logical server (LS) LS1 105 employing an exemplary VHD file manager 101 implemented according to an embodiment of the present invention. As described in a previous disclosure, a server cloud is managed by a server cloud manager (SCM), shown as SCM 103. The VHD file manager 101 is incorporated within or otherwise a component of the SCM 103 as further described below, although it may be implemented as a separate device or process or set of processes. The server cloud includes underlying physical resources that are used to implement logical resources including logical servers (otherwise referred to as virtual machines). The SCM 103 includes core components and interface components (FIG. 7) that define how the SCM 103 operates within the respective server cloud and how it interfaces external entities including other SCMs. The core components of the SCM 103 include a shared library of functions used by all SCM components and interface components. The interface components are considered part of the SCM 103 and establish interfaces with various entities.

The term "entity" is intended to refer to one or more of various types of users (e.g., subscribers, administrators, etc.), agents (logical, physical), other SCMs, applications (including application "farms"), etc. Application examples include management applications, billing applications, resource applications, etc. Many managed functions or applications may or may not have specific users. For example, a batch processing system with varying load that is not associated with any particular user(s) may be managed in accordance with embodiments of the present invention. In one embodiment, the interface components include an intelligent VHD file manager, such as the VHD file manager 101. The present disclosure primarily concerns the configuration and operation of the VHD file manager 101 and its cooperation with the other SCM functions and the virtualization software to manage and maintain integrity of VHDs and component files of VHDs of logical servers as further described below.

An authorized entity 102 accesses a server cloud via the SCM 103 and requests to login to a selected logical server, such as the logical server LS1 105. The SCM 103 in cooperation with virtualization software operating on the underlying physical system instantiates LS1 105 in the server cloud, where LS1 105 is initially a placeholder including a mount point 107 for mounting the VHD1. The SCM 103 cooperates with the virtualization software to deploy the VHD1 by accessing and retrieving its individual component files and assembling the retrieved component files to form the VHD1. Once formed, the SCM 103 mounts the VHD1 to the LS1 105. In the exemplary configuration shown, the VHD file manager 101 is linked to or otherwise interfaces a master repository 109, which includes a core library 111 and a delta files library 113. A selected core file 115 is retrieved from the core library 111 and one or more differencing or delta files 117 are retrieved from the delta files library 113. The core file 115 forms the basic identity or type of VHD and the one or more delta files 117 provide modifications or additional information for establishing a unique VHD1 incorporating disk drive functionalities of the LS1 105.

The core library 111 stores one or more "core" files, also referred to as base or template files, each used as a primary base or root file for one or more VHDs of one or more logical servers of the server cloud. Each core file in the core library 111 incorporates data, software, operating system(s) (OS) and any other information used to build a server having predetermined attributes or capabilities. Each core file may include multiple files but may also be combined into a single large data file. The illustrated core files include a Microsoft® (MS) Exchange server "EXG", an MS SQL server® (Structured Query Language), a Linux-based server system "LIN", an Oracle® based server system "ORL", an MS Windows® based server system "WIN", a VMware-based server system "EXD", any user-defined servers "USER DEF. 1", etc. Different core files may be provided for selected versions of operating system types, such as for various Linux OS versions or Microsoft OS versions (e.g., Windows® 98, Windows® 2000, Windows NT®, Windows® XP, etc.).

The delta files library 113 stores multiple delta files, e.g., D1, D2, D3, and so on, for modifying core information or other differencing information to uniquely establish the VHD for a corresponding logical server. Information in the delta files 117 performs any one or more of replacing underlying information, hiding or masking underlying information, and modifying or changing underlying information, where the underlying information includes core information (stored in the core file) and portions of differencing information stored in any previous delta files in the chain of files comprising the VHD. The LS1 105 effectively views the core file 115 through the delta files 117 which operate as overlay files of the core file 115. For example, in the exemplary embodiment shown, a first delta file 119 may be a service pack update or upgrade of the core file 115, a second delta file 121 provides information for one or more software applications installed on the VHD1 for use by the entity 102, and a third delta file 123 stores information associated with use of the VHD1 while the LS1 105 is deployed. There are two basic types of delta files, including installation files and usage or activity files, although any given delta file may be a combination of both. A delta file begins as an activity or leaf file for storing changes to the VHD, and becomes static or read-only upon request by the entity 102 or by another authorized entity, as further described below.

The master repository 109 is stored on any suitable storage means provided within or interfaced with the server cloud for storing files and information on a short or long-term basis. The storage means may be centralized in a single storage location or distributed among multiple storage locations. Thus, the master repository 109 may also be centralized or distributed. The storage means may incorporate any combination of volatile and nonvolatile resources, any combination of short- or long-term type memory devices and may include storage resources of physical servers of the server cloud (e.g., RAM and/or disk drives) and storage resources linked via a shared network. The term "storage" or "storage means" as used interchangeably herein each incorporate both short- and long-term memory types and any type of media types, including magnetic media (e.g., disk drives, magnetic tape, etc.) optical media (e.g., CD ROM, optical tape, etc.), and further including removable media types such as CD-ROM, Zip disks, floppy disks, or the like. Storage may also include communication links to one or more shared storage resources either separately or via the shared network. A local storage may include a single device (e.g. System Area Network (SAN)) or may be divided into multiple physical and logical devices (e.g., File Transfer Protocol (FTP) and Network Attached Storage (NAS) or the like), may include RAID configurations or the like with redundant information to ensure data integrity, and is preferably configured to use multiple devices to ensure scalability.

The VHD file manager 101 manages master meta information 805 (FIG. 8), as further described below, which includes location and component relationship information for constructing and deploying the VHD1 of the requested logical server LS1 105 on behalf of the entity 102, and for maintaining the validity of deployed and stored VHDs and the corresponding component files. Each VHD, including the VHD1, includes a set of component files (SOF) beginning with a core file and including one or more delta files in which the last or latest delta file is a leaf file. All of the component files of each SOF other than the leaf file are treated by the VHD as static or read-only whereas the leaf file is treated as a dynamic file that is updated while an entity is using the associated location information. The master meta information 805 includes location information, such as links or the like, to point to or otherwise locate each component file that is used to assemble the VHD for the requested logical server as well as relationship information to verify and maintain VHD and file integrity. The relationship information at least includes information that defines the relationships between component files comprising a VHD and the relationships with master copies of the component files stored in the master repository 109.

The master meta information 805 stores information to associate the VHD1 with the requested logical server LS1 105, and further links VHD1 with its component files from the master repository 109. In accordance with the logical server request to deploy VHD1, the selected core file 115 is copied from the core library 111 into a storage or memory location. The selected core file 115 includes the bulk of the information needed to assemble the VHD1 that is generally common to multiple VHDs or to a generically defined VHD. The core file 115 may include identification and attribute information necessary to make each logical server unique, including, for example, identification information and persistent attributes. The associated delta files 117 are also copied and combined with the core file 115. Each logical server is constructed with a chain of files that are sequence sensitive, where information within subsequent files in the chain over-ride any conflicting information in prior or "parent" files. Any conflicts between a delta file 117 and the selected core file 115 are resolved in favor of the delta file 117 and any conflict between delta files are resolved in favor of the more recent delta files. Also, the parent files in each SOF must generally remain unmodified to maintain the validity of the logical server(s) supported by the SOF. The selected core file 115 and delta files 117 collectively define the VHD1 and includes persistent attributes that survive de-activation of the logical server LS1 105. Additional configuration and resource information, including non-persistent attribute information or the like, may be added by the SCM 103 to instantiate the logical server LS1 105 onto a specific physical server within the server cloud.

Once the logical server LS1 105 is deployed and activated in the server cloud on behalf of the entity 102, the entity 102 may then begin using the deployed logical server. In a "stand-alone" or "persistent" mode, changes caused by use (e.g., new data or modifications) are permanently incorporated into the VHD1, which is stored intact to save the activity information. The original server LS1 105 may be re-created employing the same deployment process, but the changes are lost unless the entire logical server including its core information is stored as a separate server. The embodiment shown illustrates a "non-persistent" mode, in which changes are stored in a separate activity or delta file that may be discarded, modified, or stored and used to create a new VHD definition. The VHD file manager 101 generally determines "branching" involving the creation of new component files or leaf files and manages storage and validity of component files for each VHD deployed in the server cloud. The VHD file manager 101 is optionally configured to create a new leaf file every time a stored VHD is re-deployed in the server cloud, effectively launching a new VHD. Such operation may lead, however, to a significant number of leaf files possibly including a large number of small files with minimal changes. Alternatively, the VHD file manager 101 selectively re-opens and modifies the prior leaf file for the re-deployment if allowed by the entity 102 and when the prior leaf file is not a component of a different VHD. In one embodiment, the entity 102 may be provided the option of re-opening the last delta file 123 to continue to store further changes but only if the delta file is not currently supporting another VHD.

As illustrated, the delta file 123 was the leaf file in the immediately prior session of use of the VHD1 for the logical server LS1 105, and if it is re-opened again as a leaf file, then it becomes a new or modified leaf file 123' storing any further changes of VHD1 during continued use of the logical server LS1 105 by the entity 102. Such effectively creates a modified VHD1, shown as VHD1'. At least two options are possible for storage of VHD1'. First, the modified leaf file 123' replaces the prior leaf file 123 in the delta files library 113 effectively replacing the original VHD1 with the new VHD1'. Alternatively, the modified leaf file 123' is stored along with the leaf file 123 in the delta files library 113, so that both VHD1 and VHD1' and their constituent component files remain intact.

In addition, either the VHD file manager 101 or the entity 102 opts to keep the delta file 123 intact while a new delta file 125 is created to effectively deploy a new VHD2. The delta file 125 becomes the new leaf or activity file for the current session of use of VHD1 for the LS1 105, and the VHD2 treats the delta file 123 as a static or read-only file. Upon de-activation, the new VHD2 is maintained by the VHD file manager 101. The VHD file manager 101 keeps VHD1 intact to be recalled and later used if desired, which is achieved by storing and maintaining the core 115 and the delta files 117 in the master repository 109 to be later retrieved and assembled as VHD1 if desired. In a similar manner, after use of VHD1 storing activity information into delta file 125 for VHD2, the delta file 125 is stored into the delta files library 113 to maintain the state of VHD2. As shown, VHD1 may be later re-deployed using the core file 115 and the delta files 117 and a new delta file 127 created for another VHD, shown as VHD3. And, VHD2 may be later re-deployed from VHD1 and the delta file 125 and a new delta file 129 created for another VHD, shown as VHD4.

The VHD file manager 101 further allows an authorized user, such as the entity 102, to deploy a different VHD by branching from an earlier component file in the SOF of a stored VHD as long as a valid VHD can be deployed. For example, a new VHD5 may be deployed branching from the delta file 119 with a new leaf file 131. Also, a new VHD6 may be deployed in which the delta file 119 is retrieved and modified forming a new delta file 119'. Since the original delta file 119 is a component of other VHDs, such as VHD1-VHD5, the VHD file manager 101 maintains delta file 119 in the delta files library 113 and stores the new delta file 119' if it is desired to store VHD6.

It is readily apparent to one of ordinary skill in the art that a significant amount of management is necessary to maintain validity of the data in the master repository 109 and to track the state of each VHD for each logical server and corresponding VHDs. The underlying physical server or host views the VHD component files as a set of unrelated files. The virtualization software views the VHD component files as a set or chain of related files and combines the files into a single logical storage block (LSB) and presents the LSB to the logical server. The virtualization software links the discrete files from the leaf file to the root file. The logical server, such as the LS1 105, views the LSB as a single disk drive much like a physical server views a physical disk drive. All of the component files of each deployed VHD other than the last leaf file remain substantially unmodified to prevent corruption of the VHD. The VHD file manager 101 is provided to track and maintain the component files (core or delta file) used to support an existing VHD.

The management situation is further complicated by multiple authorized users or entities desiring to use existing VHDs without disturbing the state of VHDs for other entities. For example, the delta file 123 may have been re-deployed and modified to create new delta file 123'. However, if a different entity had previously re-deployed VHD1 with a new delta file 125, thereby creating VHD2, the delta file 123 is maintained by the VHD file manager 101 so that any and all VHDs using delta file 123 as a component file remain valid and intact. Thus, once VHD2 is created and stored, the VHD file manager 101 ensures that the delta file 123 remains stored and available without modification in the delta files library 113. If the entity 102 wishes to later re-deploy VHD1 for use, the VHD file manager 101 re-deploys VHD1 and creates a new delta file, such as the delta file 127, to effectively create a new VHD, such as the VHD3. It is noted that the delta file 125 is assumed to be different than the delta file 127 (although they theoretically could be identical), so that two different drive states, VHD2 and VHD3 are effectively created. In this manner, the data and information used to support each VHD state is maintained and available for any of the authorized entities of the server cloud.

As understood from the foregoing disclosure, the leaf files store the new information for the underlying VHD, in which any conflicts between the information are resolved in favor of the leaf file just as with any subsequent delta file. Substantially any component file may be re-deployed and modified even if supporting a different VHD for the same or a different logical server. Once any component file is retrieved from the master repository 109 and modified, it no longer matches its stored master. The VHD file manager 101 detects such modification and breaks the master link to the master copy stored in the master repository 109. The modified component file is optionally stored as a new delta file in the delta files library 113 if it is desired to store the "new" VHD. If the modified component file is the prior leaf file of the re-deployed VHD which does not serve as a component file for another VHD, then the modified leaf file may be stored as a new delta file or may replace the master copy in the delta files library 113. If, on the other hand, the leaf file serves a component file for a different VHD, the VHD file manager 101 ensures the integrity of the other VHD by maintaining the master copy stored in the delta files library 113.

FIG. 1 further illustrates treatment of each VHD as a SOF within a tree of file sets (TOFS). Any VHD is represented as a SOF. For example, VHD2=core file 115+D (delta file) 119+D 121+D 123+D 125 and VHD3=core file 115+D 119+D 121+D 123+D 125+D 127=VHD2+D 127 in which VHD2 and VHD3 each include at least one common component file. The resulting family of logical servers based on the selected core file 115 and the delta files 119, 121, and 123 is a TOFS, where the core file 115 is the root of the tree. Several branches are illustrated including the branch associated with delta file 123 between VHD2, VHD3 and VHD4. All of the deployed VHDs at any given time in the TOFS are "branches" of the tree or TOFS. In the case shown, either a common entity 102 or multiple entities created each server during separate save events or use sessions.

It is readily apparent that a substantial amount of flexibility is obtained by treating VHDs as coherent sets of stored component files or SOFs. Logical servers may be stored in a very efficient manner to optimize storage resource utilization. Rather than storing VHDs of logical servers intact, the VHDs are optionally stored as separate component files, each including a core file and one or more delta files (e.g., differencing files, installation files or activity files). In this manner, the typically large core files may be stored once locally for multiple servers thereby substantially reducing redundancy of stored information. Such redundancy facilitates moving a logical server from one physical server to another in a given server cloud since large core files need not be moved. Further, if another cloud has a similar core library 111 with one or more identical core files used to create similar VHDs, then a logical server or VHD may be moved to the other server cloud simply by moving its delta files without having to move the core file(s). Transfer of core files between server clouds, if necessary, may be done during the most convenient time periods, such as during off-peak hours and/or during low network usage. Also, concerning usage, a single core file or a chain of files may be employed to simultaneously support two or more VHDs of one or more logical servers in a given cloud, where the component files are maintained in a read-only mode. The VHD file manager 101 facilitates the efficient utilization of the storage resources by keeping track of the component files for each VHD and identifying when shared resources are available.

Figure 2:
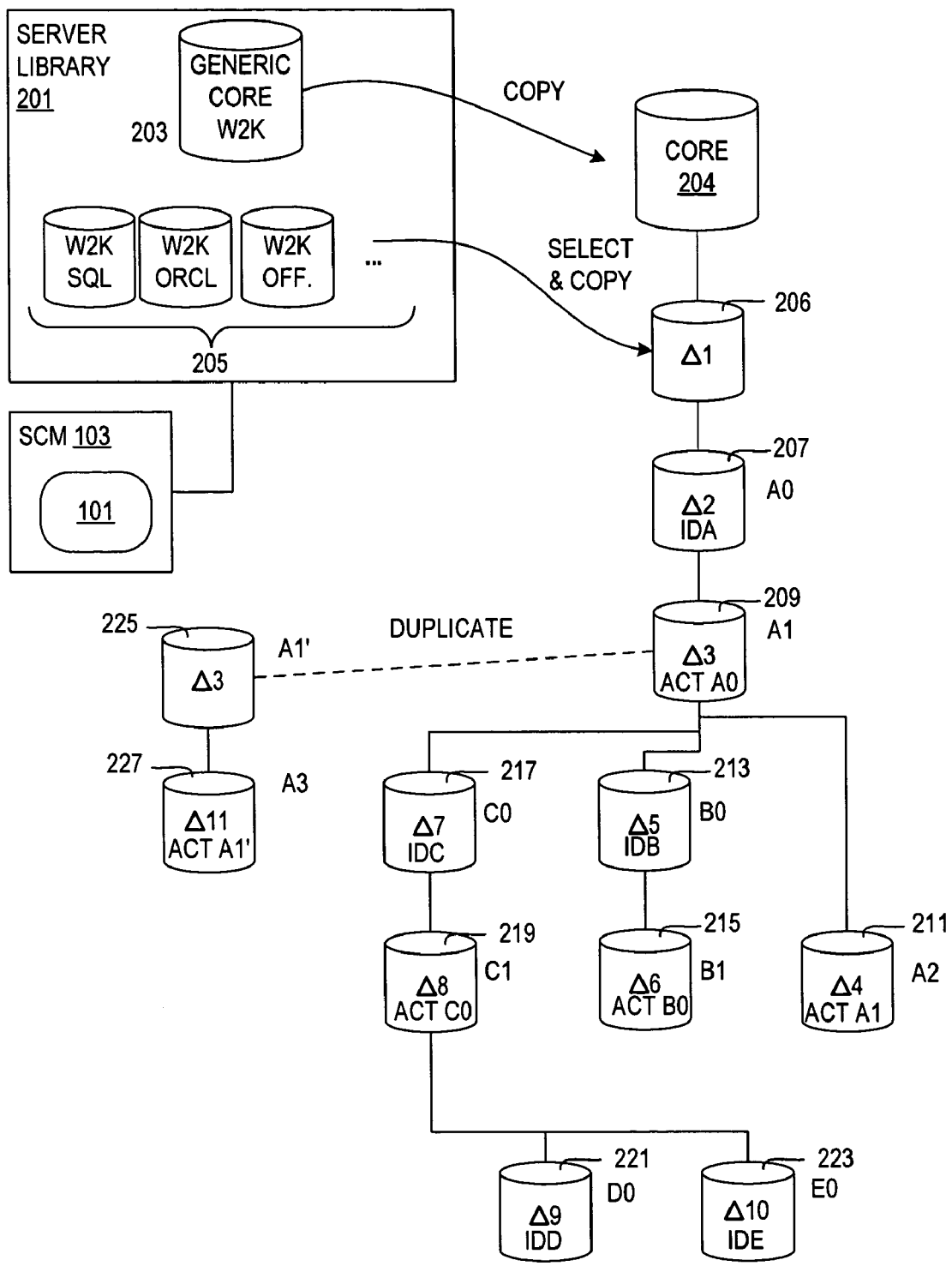
FIG. 2 is a figurative block diagram illustrating management of component files or "delta" files of SOFs of VHDs including simultaneous use according to an embodiment of the present invention.

FIG. 2 is a figurative block diagram illustrating management of component files including delta files of SOFs of VHDs including simultaneous use according to an embodiment of the present invention. The SCM 103 and VHD file manager 101 are shown managing VHD storage, deployment, use and de-activation. As described previously, a core file includes the bulk of the information needed to assemble a VHD for a logical server that is generally common to multiple logical servers. The concept may be extended to VHDs of a given type or belonging to a particular family of servers. As shown, a different core server library 201 is shown including a generic core file 203 and one or more core delta files 205. The generic core file 203 holds common information of a family of VHDs and each core delta file 205 stores specific information for a corresponding member of the server family. For example, the generic core file 203 may comprise a Windows® 2000 operating system base (W2K) for establishing any one of several different W2K family members, where the generic core file 203 is more specifically a W2K generic core file 203. As shown, a SQL server® may be made from a "W2K SQL" core delta file combined with the W2K generic core file 203. Furthermore, the W2K generic core file 203 may be combined with a "W2K ORCL" core delta file for an Oracle® based system or a "W2K OFFICE" core delta file for a system loaded with MS Office®, etc. It is appreciated that any level of component breakdown may be employed and that core files may be formed using one or more core delta files as desired. The use of a larger generic core file 203 provides greater efficiency given that the core delta files 205 are significantly smaller since information common to two or more server family members need only be stored in one file rather than being repeated for each member.

The generic core file 203 is copied as a core file 204 and a selected core delta file 205 is copied as a delta file 206, shown as "Δ1" 206. The combination of the core file 204 and the delta file 206 is similar to the single core file 115 previously described. Each successive file in the chain of files is viewed as a delta file modifying the SOF up to the root file in the file chain. The delta core file 206 modifies the core file 204 to create a base server from a family of related servers. A second delta file "Δ2" 207 is added at the end of the chain to provide server identity, in this case IDA. The combined files 204 and 206 are not, by themselves, sufficient to create a usable server. The addition of the delta file 207, however, establishes a useful VHD, shown as VHD A0. The delta file 207 essentially remains deployed in a dynamic environment during use of the VHD A0 until the changes are saved or the session is terminated, at which point additional changes are stored in a new delta file "Δ2" 209. The third delta file 209 effectively establishes a new VHD A1 based on activity associated with use of VHD A0. The second delta file 207 is considered the "leaf" or ending point of the VHD A0 during its use, which is closed as a leaf upon the creation of the next delta file 209 in the chain. When the third delta file 209 is closed upon creation of another delta file "Δ4" 211, so that changes are stored in the delta file 211 establishing another VHD A2 based on activity or usage of VHD A1, and so on.

Each SOF of each TOFS are sequential and sequence sensitive. The chain of component files in a SOF used to establish a VHD for a logical server must remain intact and unchanged to enable the server to be valid and usable. Any significant change in any component file in the supporting file chain structure renders the VHD unusable in most cases. If the modified VHD is still usable, however, the modified component file and subsequent children files may be stored in the master repository 109 to create a new VHD. Also, the component files are intended to be used in the same order each time for a given VHD and any order modification typically destroys validity. In general, the component files are used in read-only mode to prevent logical server corruption. A new leaf file, however, may be appended at the end of an existing SOF to create a new VHD.

It is also desired to manage VHD in such a manner to enable sharing among multiple entities or to otherwise enable simultaneous deployment of multiple servers with VHDs having at least one common component file. A new VHD B0 is deployed based on the VHD A1 with the addition of a new delta or delta file "Δ2" 213 added to the SOF ending at the delta file 209. In this case, the delta file 213 is an identity file IDB which establishes a new "identity" for the VHD A1, or VHD B0. The new identity information IDB over-rides the previous identity information IDA so that the new identity information applies to the new VHD B0. In this manner, the new VHD B0 may be used at the same time as the VHD A2, although not at the same time as the VHD A1 unless the chain is duplicated, as further described below, and new identity information is provided for the second chain. Use of the VHD B0 results in a new activity delta file "Δ6" 215 and a new VHD B1.

In a similar manner, a new VHD C0 is created with an identity delta file "Δ7" 217 incorporating identification information IDC. The VHD C0 may also be deployed and used simultaneously with the VHDs B0 and/or A2. Use of VHD C0 results in a new VHD C1 associated with activity delta file "Δ8" 219 incorporating usage information based on use of VHD C0. Additional VHDs may be based on the VHD C1, such as a VHD D0 generated using identity delta file "Δ9" 221 including identity information IDD and a VHD E0 generated using identity delta file "Δ10" 223 including identity information IDE, both based on the VHD C1. The VHDs D0 and E0 may be used simultaneously with the VHDs B1 and A2, if desired. It is noted, however, that the VHD C1 is no longer usable as a separate VHD once file branching occurs creating the VHDs D0 and E0, although a new VHD substantially identical to C1 may be deployed in a similar manner as shown by the relationship between the VHDs A2 and A1.

As an illustration, suppose it is desired to duplicate the VHD A1 and use independently or simultaneously with B0, D0 and E0. If the identity information IDA is to be employed, it is assumed that the VHD A2 is no longer deployed. Otherwise, different identity information would be used, as already illustrated by identity files 213 and 217. The activity delta file 209 is duplicated into new file 225 to create a new VHD A1'. The VHD A1' is substantially identical to the VHD A1. Use of the VHD A1' results in a new activity delta file "Δ11" 227 and new VHD A3. For purposes of clarity, the nomenclature A2' is avoided in this case since the new VHD A3 is not a duplicate of the VHD A2.

Figure 3A:
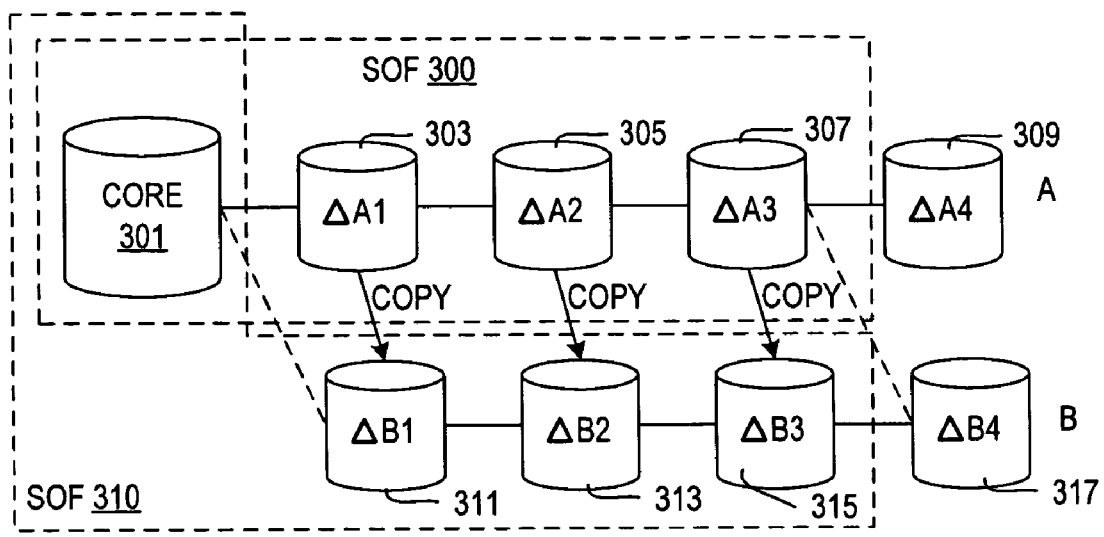
FIGS. 3A and 3B are figurative block diagrams illustrating alternative methods of providing a chain of component files to support two different VHDs deployed at the same time.
Figure 3B:
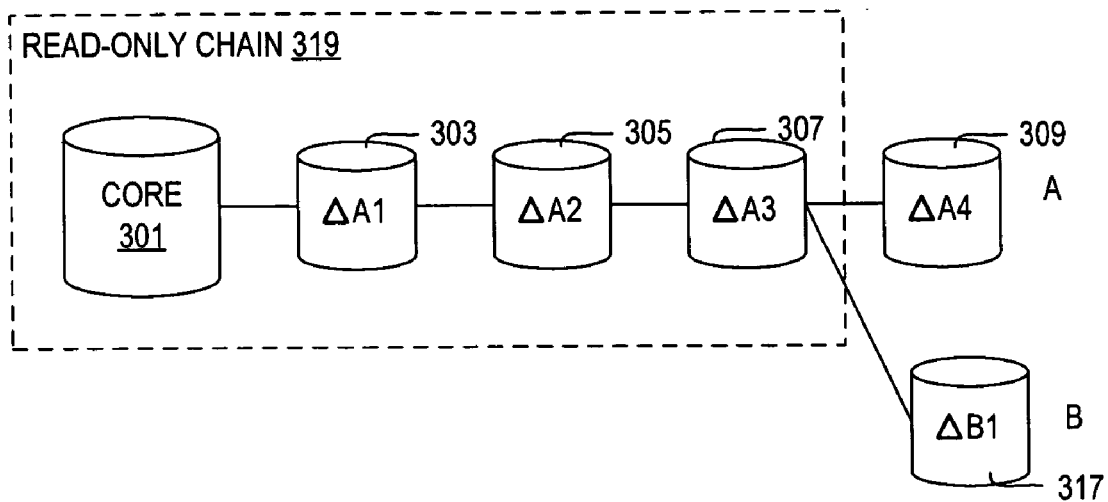

FIGS. 3A and 3B are figurative block diagrams illustrating alternative methods of providing a chain of component files to support two different VHDs deployed at the same time. As shown in FIG. 3A, a chain of component files including a core file 301 and several delta files 303 (ΔA1), 305 (ΔA2) and 307 (ΔA3) are provided to support a first deployed VHD A, shown with a leaf delta file 309 (ΔA4) appended to the SOF 300. A new VHD B is created with leaf file 317 (ΔA7) including new information and based on the same SOF 300 including the core file 301 and the delta files 303, 305 and 307. In this case, however, the delta files 303, 305 and 307 are each copied into new delta files 311 (ΔB1), 313 (ΔB2) and 315 (ΔB3), respectively, forming a new SOF 310 to support the deployed VHD B, shown with a leaf delta file 317 (ΔB4) appended to the SOF 310. The core file 301 could also be copied, but is preferably not copied and is used instead in a read-only manner to simultaneously support both chains to avoid wasting a significant amount of memory. The VHDs A and B may be deployed simultaneously. In general, the SOF 300 supporting VHD A is copied or cloned to support the new VHD B (other than the core file in the exemplary embodiment shown). The method of cloning the supporting SOF for a new VHD (with or without the root file) breaks the file dependencies between the VHDs, although each component file in each SOF remains unchanged to sustain VHD validity as previously described. The cloning approach might otherwise provide simplified management, but results in a certain level of storage inefficiency since a significant amount of information is duplicated, especially if all deployed VHDs of the server cloud were supported using cloning in this manner.

FIG. 3B illustrates an alternative approach in which the common supporting chain of component files SOF 300 including the core file 301 and the delta files 303, 305 and 307 are both used simultaneously by both of the deployed VHDs A and B. In this case, the files 301-307 are used in a read-only manner shown forming a read-only chain of files SOF 319 supporting leaf files 309, 317 for VHDs A and B, respectively, except that delta file 317 is renamed ΔB1. The VHD file manager 101 handles the management responsibilities to ensure proper usage of the files to maintain integrity of all deployed VHDs for the logical servers, including VHDs A and B.

Figure 4:
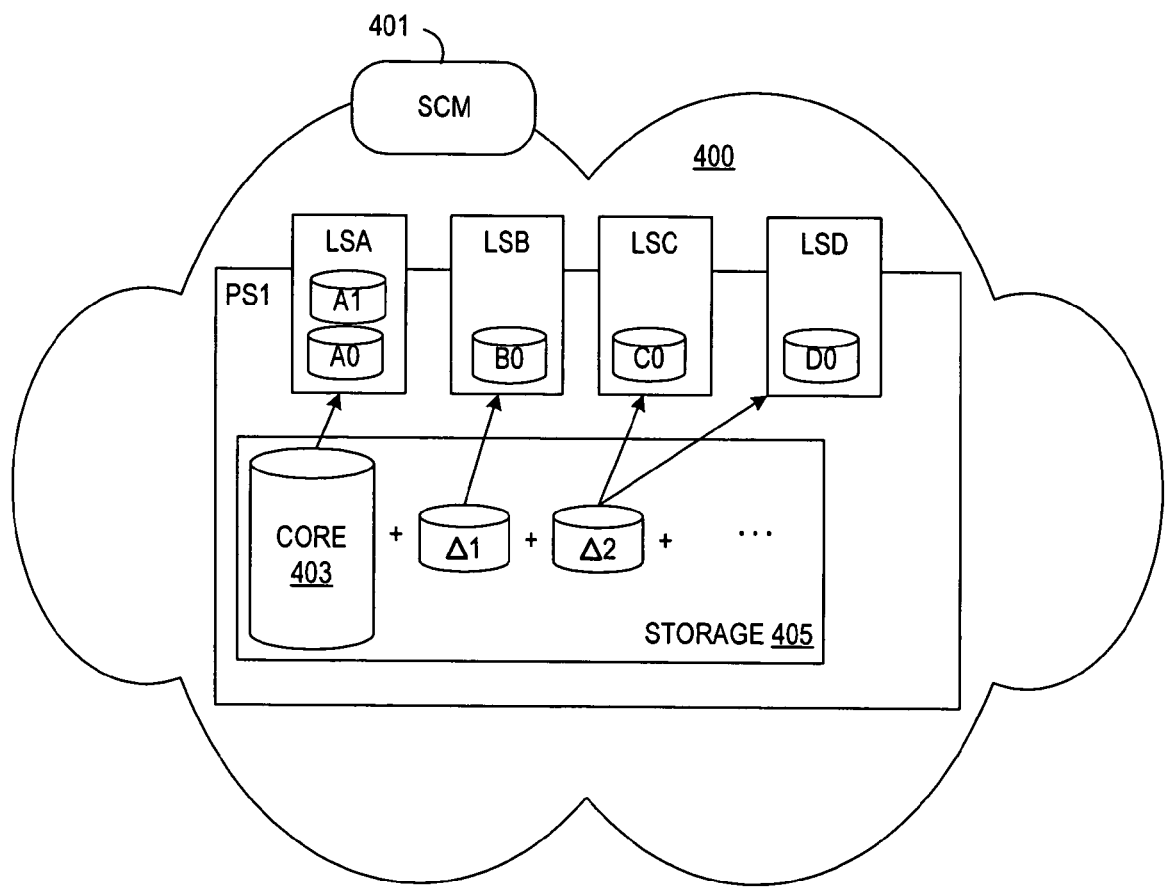
FIG. 4 is a figurative block diagram illustrating shared component files simultaneously used for multiple VHDs deployed for multiple logical servers.

FIG. 4 is a figurative block diagram illustrating shared component files simultaneously used for multiple VHDs deployed for multiple logical servers. A server cloud 400 is managed by an SCM 401 and includes at least one physical server PS1. PS1 is used to deploy four separate logical servers shown as LSA, LSB, LSC and LSD (LSA-LSD). A core or template file, shown as CORE file 403, is used for all of the logical servers LSA-LSD simultaneously. The CORE file 403 is provided within a common local storage 405, which may be implemented using any of the storage means previously described. In one embodiment, it is contemplated that the storage 405 comprises or otherwise includes a large amount of volatile memory, such as a RAM disk. A RAM disk for shared component files provides several benefits, including enhanced speed of operation and memory access.

Any type of caching architecture or technology may also be added to enhance efficiency and operation.

Each of the logical servers LSA-LSD includes a separate VHD which is implemented using any activity component files in addition to the CORE file 403. As shown, the logical server LSA has a VHD which uses the core file 403 and additional component or delta files A0 and A1 forming VHD chain CORE 403+A0+A1. The logical servers LSB, LSC and LSD further use a common delta file $\Delta 1$ stored in the common storage 405. The VHD for the logical server LSB includes additional component file B0 forming a SOF chain CORE 403+$\Delta 1$+B0. The logical servers LSC and LSD have VHDs which further use another common delta file $\Delta 2$ stored in the common storage 405. The logical server LSC has a VHD which includes additional component file C0 forming SOF chain CORE+$\Delta 1$+$\Delta 2$+C0. The logical server LSD has a VHD which includes an additional delta file D0 forming SOF chain CORE 403+$\Delta 1$+$\Delta 2$+D0. It is appreciated that each of the shared files in the storage 405 are used simultaneously without interference between the VHDs of the logical servers. Since logical server operation depends on information stored within each of the common component files CORE, $\Delta 1$ and $\Delta 2$, then these common files are intended to be used on a read-only basis. In this manner, the logical servers generally do not modify the underlying shared component files. If a component file does change for any reason, the VHD file manager 101 detects the change and branches (e.g., generates a new leaf or delta file) to maintain validity of the VHDs.

Figure 5:
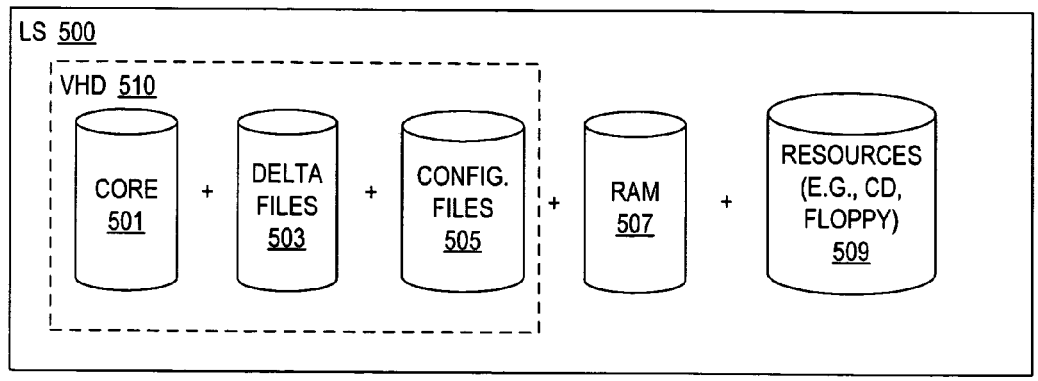
FIG. 5 is a figurative block diagram of a portion of an exemplary logical server formed by an exemplary SOF illustrating saving the entire state of a logical server including its VHD.

FIG. 5 is a figurative block diagram of a portion of an exemplary logical server (LS) 500 formed by an exemplary SOF illustrating saving the entire state of a logical server including its VHD 510. The SOF is typically very large and includes one or more core files 501, one or more delta files 503, and one or more configuration files 505 forming the VHD 510. The core files 501 may include one large core file or may be formed using multiple core files as previously described. The delta files 503 include any activity files. The configuration files 505 include configuration and attribute information used to instantiate the corresponding logical server on a physical server. The SOF may further include a RAM file 507 and one or more resource files 509, illustrating that an SOF may include information other than the VHD. In this manner, it is appreciated that the VHD file manager 101 may manage additional information other than just the VHD, and thus serves to manage all component files of a logical server and not just the files of its VHD.

During use, the LS 500 includes a defined RAM that is used for various purposes including software storage and execution. The LS 500 may be de-activated and stored, in which case it may be desired to store the RAM state (data in the RAM) in order to re-deploy the LS 500 in its exact state at a later time on the same or different physical resource. The RAM file 507 is provided to store the current RAM state. Also, the state and/or information of any additional resources associated with a given logical server (e.g., CD or floppy drives) may be stored in one or more resource files 509. It is appreciated that any logical server may be de-activated and broken down into a SOF, so that the SOF may be stored, copied or moved in a convenient manner to correspondingly store, copy or move the corresponding logical server.

The physical SOF or chain of component files representing any given logical server may include a relatively large base template file that uses a significant amount of the storage resources of a physical server, such as, for example, 6 gigabytes (GB) of disk storage. The actual logical server, when deployed, might only use a portion of the total file size, such as, for example, 2 GB of the total 6 GB. An additional core delta file may be included having a physical size of 2 GB. The core delta file does not add to the total of 6 GB so that the total usable size remains at 6 GB. Also, the logical server may actually use a somewhat smaller amount of storage, such as 1.5 GB of the 2 GB physical size of the core delta file. A physical identity file is typically small in comparison, such as, for example, 100 kilobytes (KB). When incorporated into a logical server for deployment, the identity file modifies existing information within the logical server and might not increase the actual storage usage of the logical server. Additional activity or work files are also relatively small, such as, for example, 500 KB, and the logical server may only use a portion of the activity files. In this manner, the usable size of the logical server is effectively the same as the initial core file (e.g., 6 GB) and the actual logical server size when deployed may be significantly smaller than the total usable size (e.g., 3.5-4 GB total size of 6 GB).

Figure 6:
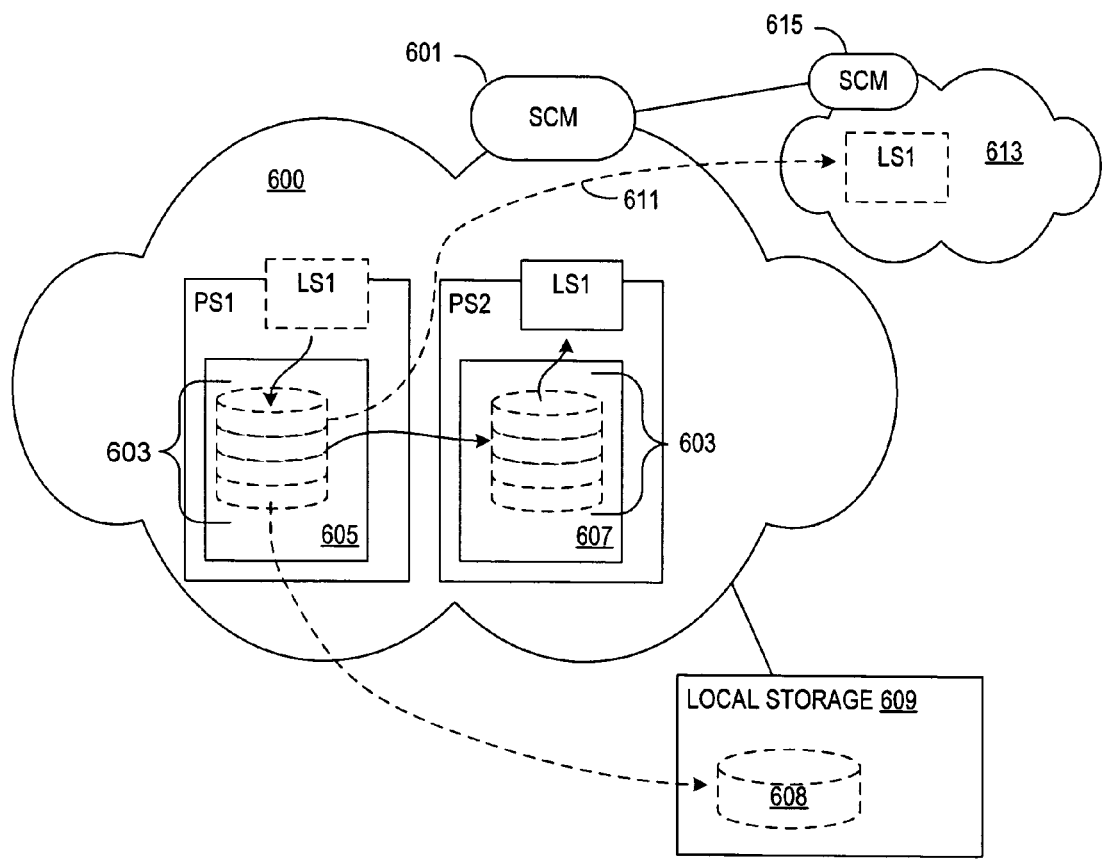
FIG. 6 is a figurative block diagram illustrating moving a logical server by moving its component files.

FIG. 6 is a figurative block diagram illustrating moving a logical server by moving its component files. A server cloud 600 is managed by an SCM 601 and includes at least two physical servers PS1 and PS2. A logical server LS1 is initially deployed on PS1. The logical server LS1 is de-activated and broken down into a SOF 603 in storage 605 of PS1. The SOF 603 is moved to storage 607 of PS2 and used to deploy the logical server LS1 on PS2. Only the current files are moved to PS2 and any unused files, shown at 608 (e.g., unused files of an existing TOFS), either remain on PS1 or may be moved to another storage means, such as a local storage 609. A dashed arrow 611 illustrates an alternative move in which LS1 is moved to another server cloud 613 managed by an SCM 615. The move is very similar in that active files of LS1 are moved to the server cloud 613 to move LS1.

Figure 7:
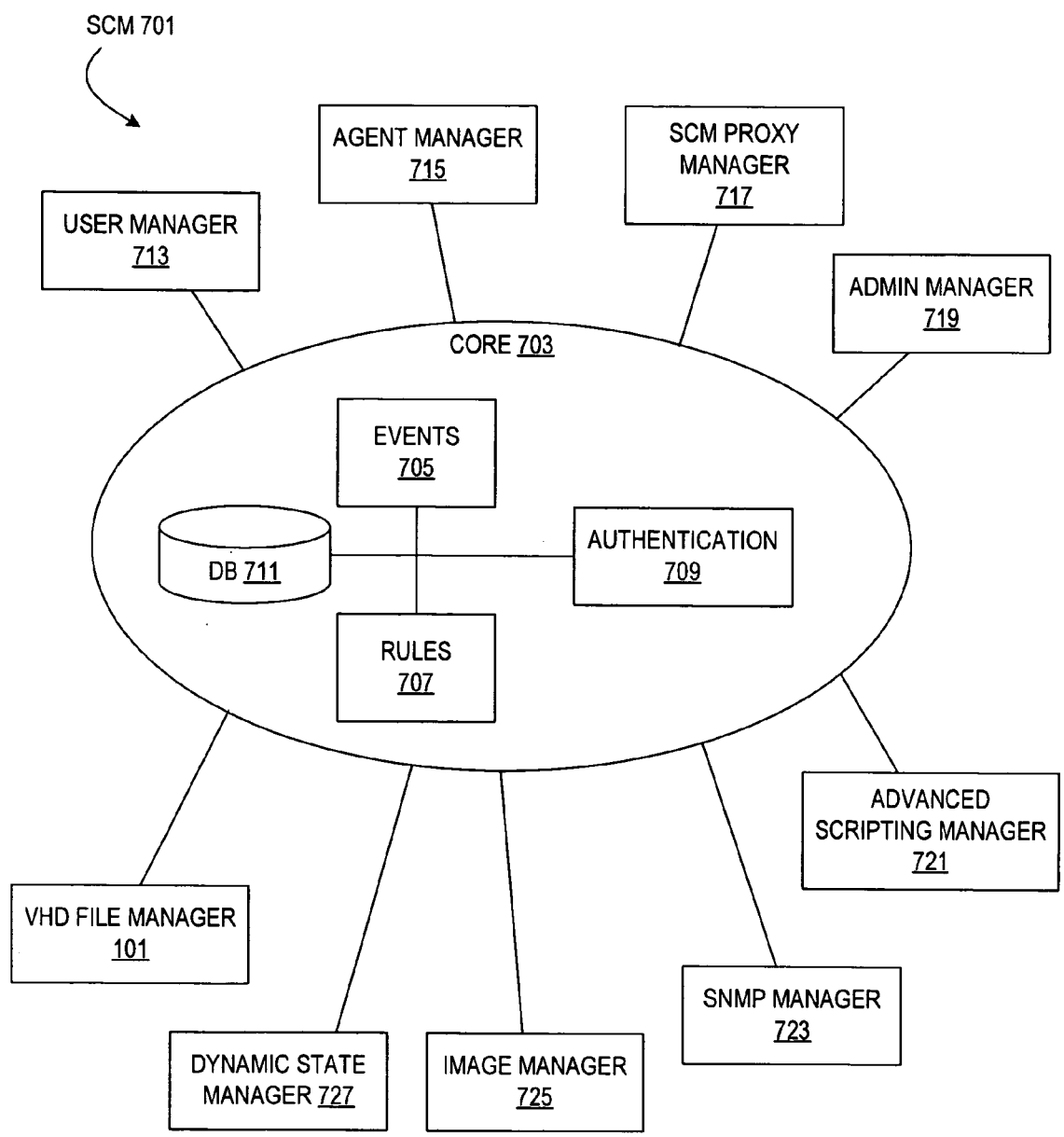
FIG. 7 is a block diagram illustrating the fundamental components of an exemplary SCM of a typical server cloud including the VHD file manager of FIG. 1 according to an embodiment of the present invention.

FIG. 7 is a block diagram illustrating the fundamental components of an exemplary SCM 701 of a typical server cloud. The SCM 701 is intended to be an exemplary embodiment of any of the SCMs described herein, including for example, the SCMs 103, 301 and 501. The SCM 701 includes core components 703 and interface components that define how the SCM 701 operates within the cloud and how it interfaces external entities including other SCMs. The core components 703 of the SCM 701 include an events engine 705, a rules engine 707, an authentication engine 709 and a database (dB) 711. The core components 703 comprise a shared library of functions used by all SCM components and interface components. The interface components are considered part of the SCM 701 and establish interface with external entities (e.g., users, administrators, agents, other SCMs, applications, etc.).

The database 711 stores data and parameters associated with the SCM 701 and generally defines how the SCM 701 tracks data and information. The database 711 is integrated with the core engines 705-709 and may even incorporate all or substantial parts of any one or more of the core engines 705-709. The database 711 includes, for example, data validation, data formatting, and rules validation. The event engine 705 controls and manages all of the events to be performed by the SCM 701, where such events are either immediately performed or queued for later execution. It is noted that "commands" and "actions" are generally synonymous and that "events" are commands or actions being performed or that represent an actual request to implement one or more commands. The rules engine 707 ensures that the SCM 701 operates in a consistent manner with respect to data and information and applies the appropriate level of security for each operation. The operations of the SCM 701 follow specific requirements and rules as validated and enforced by the rules engine 707, including, for example, credential and role information. The authentication engine 709 is used to validate users (explicit rights) and agents (implicit rights) and to generate and issue tokens or similar security credentials. The authentication engine 709 accesses the database 711 to assign the corresponding privileges attached to each role to the authenticated user according to that user's role or authorizations.

The SCM 701 may include one or more interface components that implement an interface layer, such as managers that implement interfaces with specific-type entities. Each interface component has its own needs and methods requirements and is designed to handle the operation of commands for specific entities. As shown, the interface components include a user manager 713, an agent manager 715, an SCM proxy manager 717, an administrator manager 719, an advanced scripting manager 721, a simple network management protocol (SNMP) manager 723, an image manager 725, a dynamic state manager 727, and the VHD file manager 101. The interface component managers shown and described herein are exemplary only, where each is optional depending upon the particular configuration and design criterion and where additional interface components may be defined, generated and deployed in a similar manner. Each SCM will have at least one interface component.

The user manager 713 manages access to the SCM 701 and the resources of the associated server cloud by users or entities as previously described. The user manager 713 builds appropriate user interfaces and translates SCM data into useful screens or renderings for display or consumption by each entity. The agent manager 715 coordinates SCM events with the appropriate agent(s) or other system components within the associated server cloud, such as physical server agents (PSA), logical server agents (LSA), etc. The SCM proxy manager 717 enables communication with other SCMs including proxy operations as described herein. The administrator manager 719 incorporates scripting logic and renders user interface(s) to administrators and provides useful access and control of the SCM 701 and the server cloud and associated functions to one or more administrators. The advanced scripting manager 721 enables a more sophisticated scripting interface with other management systems, such as a billing package or the like. The SNMP manager 723 enables communication with an SNMP management system or entity. The image manager 725 controls the state and instances of logical servers of the SCM 701. The dynamic state manager 727 enables optimized use of physical and logical resources and files throughout the entire domain of the SCM 701, including the physical and logical resources of its home cloud and associated resources within subclouds of other server clouds. The VHD file manager 101 maintains location and relationship information of component files for each VHD of each logical server managed by the SCM 701. The VHD file manager 101 also manages the identity and storage of previously deployed VHDs including its last active leaf file, as further described below.

Figure 8:
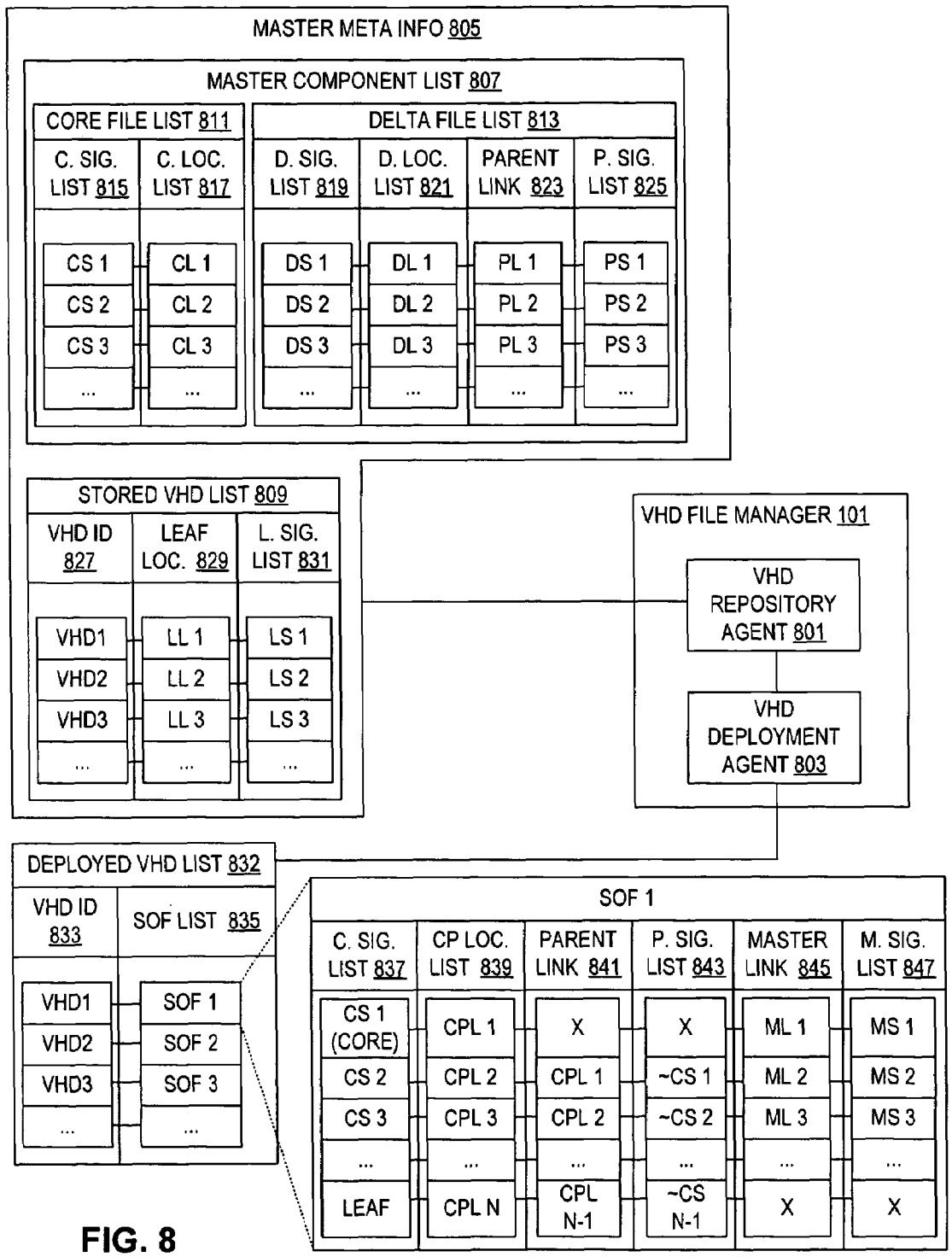
FIG. 8 is a more detailed block diagram of an exemplary embodiment of the VHD file manager of FIGS. 1 and 7 and its management of meta data for tracking and verifying the component files in the master repository and in the server cloud.

FIG. 8 is a more detailed block diagram of an exemplary embodiment of the VHD file manager 101 and its generation and management of meta data for tracking and verifying the component files in the master repository 109 and in the server cloud. In the particular embodiment shown, the VHD file manager 101 includes a VHD repository agent 801 and a VHD deployment agent 803. Although generally shown as single agents, either or both of the agents 801 and 803 may actually comprise one or more similar agents cooperating with each other or subagents cooperating in a cohesive manner as known to those skilled in the art. The VHD repository agent 801 generates and manages master meta information 805, stored by the system (e.g., underlying physical storage accessed via virtualization software), for maintaining and tracking the component files stored in the master repository 109. The master meta information 805 includes a master component list 807 and a stored VHD list 809. The master component list 807 includes a core files list 811 and a delta files list 813. The core files list 811 includes a core signature list 815 and a core location list 817. The core signature list 815 of the core files list 811 includes a "signature" of each core file stored in the core library 111 of the master repository 109 and the location list 817 stores a link (e.g., an address or link or pointer or any other location information) for locating the core file in the core library 111. For example, each core file has a "core signature" or CS, shown as CS 1, CS 2, etc., and a "core location" or CL, shown as CL 1, CL 2, etc. In this manner, Each core file stored in the core library 111 of the master repository 109 can be located and its contents verified via its signature.

The signature information of each signature may include, for example, a file name, a date stamp, file size, one or more CRC values, and/or any other information that collectively uniquely identifies the file and that ensures integrity of the file contents. The signature information is used to determine if the file contents have changed to ensure file integrity. Thus, if a core file stored in the core library 111 is copied into a server cloud to deploy a VHD, the signature information is maintained along with it so that the signature information may later be compared to determine whether the contents of either file has changed since the master was copied. If for any reason the master copy is changed or corrupted, the deployed file may be used to restore the master. If the deployed file is corrupted, the master copy is still available so that the original data remains intact. If the deployed file is modified, it is optionally stored as a new component file so that user data is not lost.

The delta files list 813 includes a delta signature list 819 and a corresponding delta location list 821 in a similar manner as the core files list 811 to locate and verify the contents of each delta file in the delta files library 113. The delta files list 813 further includes a corresponding parent link (PL) list 823 providing a link or pointer to the parent file of the delta file. The parent file may be another delta file or a core file of the SOF. The delta files list 813 further includes a parent signature (PS) list 825 including the signature of the parent pointed to by the PL value in the parent link list 823. Thus, for example, the delta file identified by signature DS 1 and located at DL 1 has a parent file pointed to by PL 1 with a corresponding parent signature PS 1. The parent file is located using the parent link and its signature is compared with the parent signature value stored by the "child" delta file. In this manner, the parent file may be verified by comparing the signatures to ensure against corruption of data and/or to enable storage of modified delta files.

The stored VHD list 809 provides meta information for the stored state of the VHDs created and deployed in a given server cloud or server domain accessible by a corresponding SCM. The stored VHD list 809 includes a VHD identifier (ID or TAG) list 827 which identifies each VHD with an ID or TAG or name value, such as VHD1, VHD2, etc. The VHD ID list 827 is linked to a leaf location (LL) list 829 which provides the location of the last leaf file for the corresponding VHD during its last deployed session in the server cloud. The VHD ID list 827 and the LL list 829 are further linked to a leaf signature (LS) list 831 which includes the signature of the corresponding leaf file. For example, the leaf file for VHD1 is located using link LL 1 and the signature of that leaf file is stored as signature information LS 1. The persisted signature information of the leaf is provided for verification to ensure that the leaf file being pointed to has not been modified or corrupted which might otherwise destroy the validity of the VHD.

The VHD deployment agent 803 of the VHD file manager 101 monitors and manages generation and deployment of the VHDs and their corresponding component files in the server cloud. In the illustrated embodiment, the VHD deployment agent 803 generates and manages a deployed VHD list 832, stored by the system (as previously described), for maintaining and tracking the component files copied from the master repository 109 and being used for VHDs of deployed logical servers. The deployed VHD list 832 includes a VHD ID list 833, similar to the VHD ID list 827, which identifies each VHD deployed in the server cloud, such as VHD1, VHD2, etc. The VHD ID list 833 is linked to a corresponding SOF list 835, which references meta data of the set of component files comprising the deployed VHD. Each entry in the SOF list is a record that stores information for tracking the component files of deployed VHDs in the server cloud. For example, a deployed VHD named VHD1 is linked to SOF 1, a deployed VHD named VHD2 is linked to SOF 2, and so on.

The SOF 1 is shown in further detail, where each SOF is similar. As illustrated, the entry SOF 1 includes a component signature list 837 providing the signature of each of the components of VHD1 and a corresponding component (CP) location list 839 locating each listed component. For example, VHD1 includes a number "N" of component files with signatures CS 1, CS 2, CS 3, . . . , CS N, which are located at CPL 1, CPL 2, CPL 3, . . . , CPL N, respectively. The parent file for each listed component is located using a parent link list 841 and the corresponding signature of each of the listed parent files is maintained in a parent signature list 843. Each component file is further linked to a master link (ML) list 845, which links or points to the master copy of the component file stored in the master repository 109. Furthermore, the signature of the master is maintained in a master signature (MS) list 847. In this manner, the VHD deployment agent 803 can manage the validity of each of the components of each deployed VHD.

In the case illustrated, the first entry in the SOF 1 refers to the core of VHD1 with signature CS 1 and location CPL 1. Since the core file has no parent, the entries for the parent link and parent signature are shown with an "X", which is any defined null value indicating a non-value (e.g., zero or null value). The next component file with signature CS 2 and location CPL 2 has a parent link back to the core file, such as CPL 1 pointing back to the core file. The parent signature for CS 2 is shown as "~CS 1" since it is intended to be the same signature as the signature the parent file or core file CS 1 and is used for verification as previously described. The remaining entries up to the last leaf file are listed in similar manner. The leaf file has a signature entry "LEAF" which is not necessarily defined during use since the contents of the leaf file are dynamic while VHD1 is being used. The parent link CPL N-1 point to the previous entry in the list with signature ~CS N-1. The master link and signature are null values "X" since the leaf file is newly created and not yet stored.

In operation, an entity requests a logical server corresponding to a particular VHD, identified by a VHD ID or name. The VHD deployment agent 803 detects the request and interfaces the VHD repository agent 801 to locate and retrieve the identified VHD. The VHD repository agent 801 consults the stored VHD list 809 for the requested VHD by searching the VHD ID list 827 for the requested VHD ID. If the requested VHD is found, the corresponding prior leaf file is located in the delta file list 813 using the link from the leaf location list 829. The located leaf is verified by comparing the leaf signature stored in the leaf signature list 831 with the signature from the delta signature list 819 of the located delta file to ensure integrity of the leaf file. The parent of the leaf file is then located via the parent link list 823, which may be another delta file or a core file. The signature in the parent signature list 825 is compared with the signature of the parent file to ensure integrity of the parent file. This process is repeated until all of the component files of the SOF including the core file of the requested VHD are located and verified. This information is passed back to the VHD deployment agent 803, which cooperates with the SCM of the server cloud and the virtualization software to retrieve and copy the component files from the master repository 109 into the server cloud to deploy the requested VHD for the requested logical server.

During initialization of a requested logical server, the VHD file manager 101 determines whether a new leaf file is created to avoid corrupting or invalidating currently stored VHDs. In one embodiment, for example, the VHD repository agent 801 determines whether the last leaf file located from the leaf location list 829 is used as a parent file for another delta file of another VHD. One method to do this is to search the parent link list 823 and compare with the pointer of the leaf file to determine if the same leaf file identified in the stored VHD list 809 serves as a parent file for another delta file in the delta file list 813. If so, then the VHD deployment agent 803 manages creation of a new leaf file for the re-deployed VHD which is linked to the prior leaf file, which simply becomes another delta file in the SOF of the VHD. If the leaf file is not a parent of another delta file, then the entity may be provided the option of re-opening and modifying the leaf, or creating a new leaf linked to the prior leaf. In one embodiment, by default the VHD file manager 101 automatically generates a new leaf file so that the prior leaf file becomes another delta file in the SOF of a new VHD. Any changes during use of the VHD is stored in the new leaf file to maintain integrity of any other VHDs relying on the information stored in the previous leaf file. The VHD is given a new name added to the VHD ID list 833 and the SOF meta data is generated and a new entry is made in the deployed VHD list 832.

When the session for a deployed VHD is closed, the VHD is effectively shut down and its component files verified and stored. If the VHD is entirely new and not based on an existing VHD, then a new VHD entry is made in the stored VHD list 809 to enable later use. If the core file was pulled from the core library 111, then the signature information is compared for verification and if valid, the memory used for the previously deployed file is released unless the file is being used by another deployed VHD at that time. It is noted that even if one or more component files of a de-activated VHD are not being used by another VHD, the de-activated component files may remain dormant yet valid in memory for a period of time or indefinitely in a least-recently used (LRU) scheme or the like. Such dormant component files may be re-deployed for the same or related VHDs at any time and effectively serve as a cache of dormant component files. Such caching operation improves efficiency since dormant cached component files need not be re-copied from the master repository 109. The VHD file manager 101 ensures validity of cached component files by comparing and verifying signatures as previously described. If the core file is new or otherwise modified, then it is added to the core library 111 and its meta data is added to the core file list 811. If the core file in the core library 111 has been corrupted, then the de-activated deployed file is optionally used to regenerate the master copy and the signatures and linkage information are regenerated or otherwise updated. Any new delta files are added to the delta file list 813 and linked back to the core file, and a new VHD entry is added to the stored VHD list 809.

If the VHD was based on a previously stored VHD, such that one or more of the component files are already stored in the master repository 109, then the master link list 845 is used to locate the master component file meta data and corresponding signatures from the master signature list 847 are used to verify the integrity of the copied component files with the stored master. Recall that the component files copied from the master repository 109 are intended to be used as read-only so that their contents should not change and should be the same as their master counterparts. The corresponding signature information is compared to verify integrity of the component files. Every component file that is the same as its master counterpart need not be re-stored and can be discarded or cached. If for any reason a deployed component file does not match its master, then it is determined whether the master file has been corrupted or the deployed file has been modified. If the master component file has been corrupted, then the deployed file may optionally be used to replace the corrupted master in the component file list 809. Otherwise, the modified deployed component file and the remaining children component files linked to that modified component file are newly stored in the master repository 109 and a new VHD is added to the stored VHD list 809. In many cases, at least one new leaf file is added to a retrieved VHD, representing "use" of the prior VHD, effectively forming a new VHD. The new delta files are stored in the component list 809 and a new VHD entry is made in the stored VHD list 809.

The master repository 109 and the master meta information 805 as controlled by the VHD file manager 101 provide many advantages and benefits. The bulk of the stored data is in the core library 111 storing rather large core files. Yet only one copy of a core file is necessary to support any number of VHDs of a TOFS based on the common core file. The delta files stored in the delta file library 113 are relatively small compared to core files, yet there may be a relatively large number of stored delta files corresponding to a relatively large number of different, related or unrelated, VHDs. Related VHDs share at least one component file, such as having a common core file and possibly one or more delta files. Each delta file represents usage of an existing VHD, which effectively creates a new VHD. The master meta information 805 enables tracking of the identity and relationship of each component file of each VHD. An entity has the option of creating a new VHD or deploying any of the stored VHDs if authorized to do so. For example, the VHD file manager 101 presents a list of existing VHDs from the stored VHD list 809 for the entity to choose from. Substantially all of the differencing information is stored and remains intact so that any useful VHDs supporting useful logical servers may be retrieved and deployed at any time. The meta data information provides verification of each component file of each SOF of each VHD. Corrupted data is discoverable and usually replaceable with valid data and modified data is stored for later deployment if desired.

Figure 9:
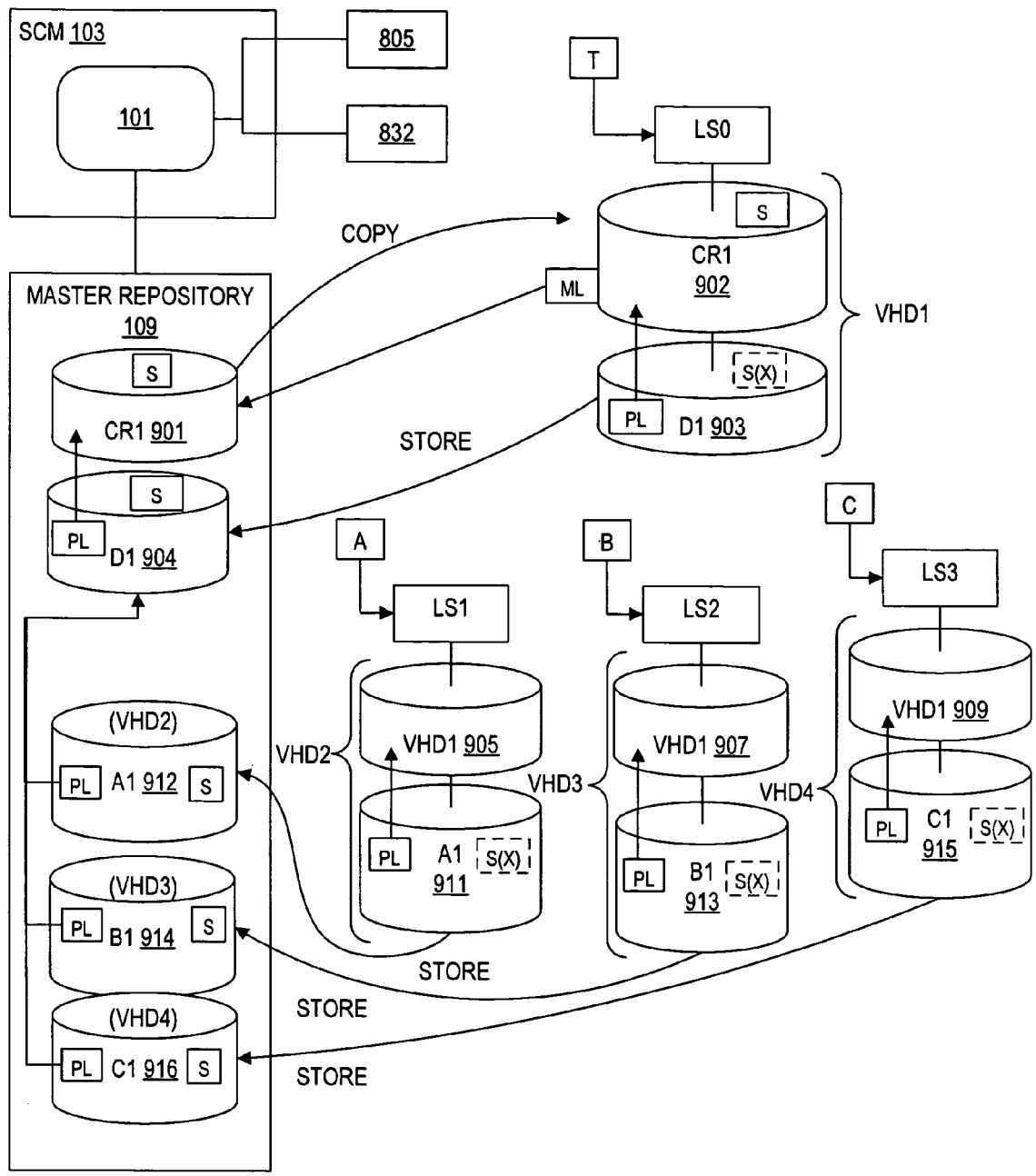
FIG. 9 is a figurative block diagram illustrating creation, deployment and use of a common VHD by multiple users and further illustrates signature and linkage information according to an exemplary embodiment of the present invention.

FIG. 9 is a figurative block diagram illustrating creation, deployment and use of a common VHD by multiple users and further illustrates signature and linkage information according to an exemplary embodiment of the present invention. The SCM 103 and VHD file manager 101 are again shown managing VHD storage, deployment, use and de-activation. Also, the master repository 109 is shown storing the component files and the VHD file manager 101 is shown linked to the master meta information 805 and the deployed VHD list 832. A first user entity, referred to as "T", preliminarily deploys a first logical server LS0 and mounts a VHD shown as VHD1 to the logical server LS0. The VHD1 includes a core file 902 named "CR1" and a delta file 903 named "D1". The core file 902 was copied from a master core file 901 and the delta file 903 is newly created and did not previously exist in the master repository 109. The master core file 901 and the copied and deployed core file 902 are shown with a signature "S" and the copy core file 902 includes a master link "ML" pointing back to the master core file 901. The delta file 903 includes a parent link "PL" pointing to the deployed core file 902 and is shown with a signature S with value "X" since the file is dynamic and changing while VHD1 is being used. The signatures and other meta data for VHD1 is stored in the deployed VHD list 832 while VHD1 is deployed.

In this example, the user T is a teacher who creates VHD1 for purposes of teaching a class of student users employing VHD1. During a session while the delta file 903 is the leaf file, T installs one or more instructional applications onto VHD1. For example, the user T installs a software application onto VHD1 for purposes of teaching the student users how to use the software application. When T completes VHD1, it is de-activated and stored in the master repository 109. The master core file 901 already exists with its signature and the signatures are compared to ensure integrity. The delta file 903 is stored in the master repository 109 as delta file 904 with a parent link PL pointing to the master core file 901.

During the subsequent training session, three student users A, B and C request logical servers LS1, LS2 and LS3, respectively, each deploying a copy of the VHD1 created by the teacher user T. Three separate copies of VHD1, shown as VHD1 905, VHD1 907 and VHD1 909, are mounted to the logical servers LS1, LS2 and LS3, respectively. Each VHD1 of the logical servers LS1-LS3 are essentially identical to the original VHD1 created by the teacher user T and includes component files substantially identical to the master core file 901 and the delta file 904. The signatures, parent links and master links are not shown of each deployed VHD1 are not shown for purposes of simplicity of illustration but are understood to be present. The VHD file manager 101 creates three new delta files including a first delta file 911 linked to VHD1 905 and named "A1" associated with student user A, a second delta file 913 linked to VHD1 907 and named "B1" associated with student user B, and a third delta file 915 linked to VHD1 909 and named "C1" associated with student user C. The VHD1 905 and delta file 911 create a new second drive VHD2, the VHD1 907 and delta file 913 create a new third drive VHD3, and the VHD1 909 and delta file 915 create a new fourth drive VHD4. Changes made by the student users A, B and C are stored in the delta files 911, 913 and 915, respectively, during the classroom session without disturbing the content of the deployed copies of VHD1 or the master component files of VHD1 (i.e., 901 and 904) stored in the master repository 109. The delta files 911, 913 and 915 each have parent links pointing to their respective parent copies of VHD1.

At the completion of the training session, the delta files 911, 913 and 915 are stored into the master repository 109 as delta files 912, 914 and 916, respectively. The delta files 912, 914 and 916 each have a stored signature and a parent link pointing to the stored master delta file 904 in the master repository 109. The stored delta files 912, 914 and 916 are the prior leaf files for drives VHD2, VHD3 and VHD4, which are entered in the stored VHD list 809 of the master meta information 805. In subsequent sessions, the same or different student users may re-deploy any of the stored drives VHD1, VHD2, VHD3 or VHD4.

Figure 10:
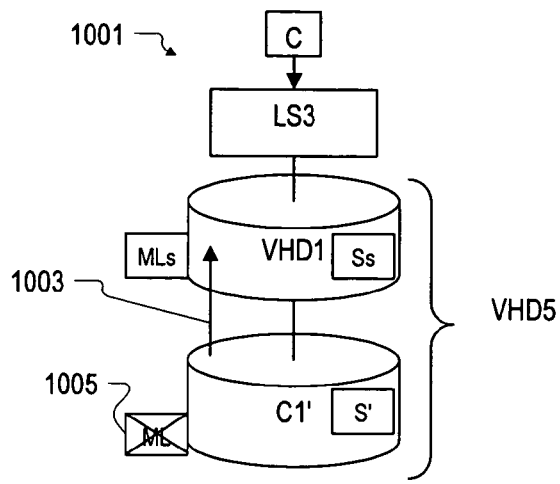
FIGS. 10 and 11 illustrate various scenarios of deployment and use of VHDs shown in FIG. 9.

FIG. 10 shows at 1001 the logical server LS3 re-deployed at a subsequent time with VHD1 and a copy of C1 916 in which C1 is re-opened and modified during use as a leaf file C1' effectively creating a new VHD5. The deployed copy of VHD1 is shown with multiple master links MLs and multiple signatures Ss, one for each component file of VHD1. The leaf file C1' includes a parent link 1005 to VHD1 and is dynamic so that its signature changes over time, shown as S'. The VHD file manager 101 either does not create a master link for C1' since it is re-opened as a leaf file, or the initial master link ML is broken as shown at 1007 when the VHD file manager 101 detects a mismatch between signatures of C1' and C1 916.

Figure 11:
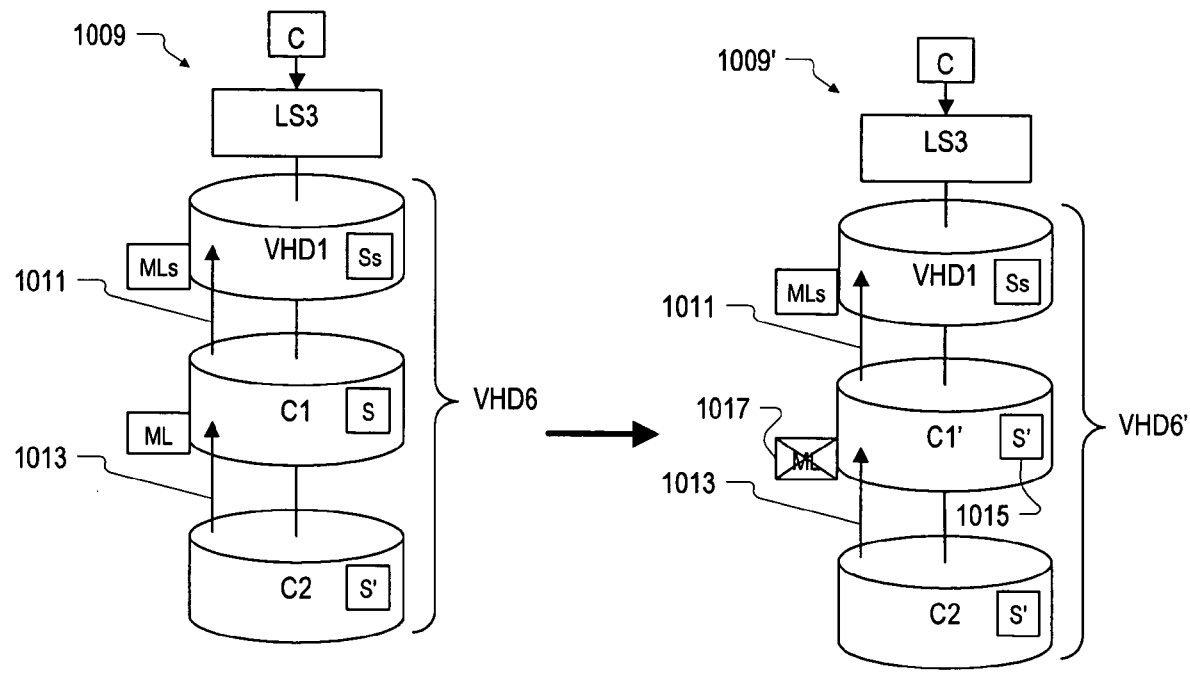

FIG. 11 shows at 1009 the logical server LS3 re-deployed at a subsequent time with VHD1 and a copy of C1 916 in which C1 is maintained as a read-only file and a new leaf file C2 is created effectively creating a new VHD6. In this case, C1 for VHD6 has a parent link 1011 back to VHD1, a signature S and a valid master link ML pointing back to C1 916 and the leaf file C2 has a parent link 1013 pointing back to its parent C1. The leaf file C2 may have a signature shown as S' since it is dynamic and changing during use. At a subsequent time during use of VHD6 as shown at 1009', the VHD file manager 101 detects that the signature of C1 has changed, shown as S' at 1015, so that C1 has been modified, shown as C1'. The VHD file manager 101 breaks the master link for C1', shown at 1017, since it no longer matches its master file C1 916 in the master repository 109. The deployed VHD6 effectively becomes a new VHD6' as a modified version of VHD6.

In one scenario, as determined by the VHD file manager 101, VHD6 is corrupted and no longer usable and data stored in C2 is potentially lost or otherwise incoherent. Note that although C2 still has a parent link 1013 back to C1', the parent signature for C2 no longer matches the signature of C1' since it has been modified. In another scenario, VHD6 is potentially salvaged by re-deploying it using the stored C1 916 to replace the corrupted file C1'. In yet another scenario, C1' and C2 are both still valid and the new VHD6' is valid. In this latter case, C1' and C2 are stored in the master repository 109 and the meta data for VHD6' maintained by the VHD file manager 101 in the master meta information 805 defining a new VHD6'.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A virtual hard drive (VHD) file manager system for a virtualized logical server cloud that interfaces virtualization software to manage VHDs for logical servers of the server cloud, comprising:
   a repository agent that generates and manages master meta information for maintaining identity and integrity of and relationship between a plurality of master component files stored in a master repository, and that tracks identity of stored VHDs and links said stored VHDs with said master component files; and
   a deployment agent that facilitates deployment of each logical server in the server cloud by cooperating with said repository agent to copy master component files from said master repository, that generates and manages deployment meta information of VHDs deployed in the server cloud, and that cooperates with said repository agent to manage storage of VHDs and corresponding component files into said master repository.

2. The VHD file manager system of claim 1, wherein said master meta information comprises a master component list and a stored VHD list.

3. The VHD file manager system of claim 2, wherein said master component list comprises a core file list and a delta file list.

4. The VHD file manager system of claim 3, wherein said core file list comprises signature and location information for each core file stored in said master repository.

5. The VHD file manager system of claim 4, wherein said delta file list comprises signature and location information for each delta file stored in said master repository.

6. The VHD file manager system of claim 5, wherein said delta file list further comprises parent link and parent signature information associated with each said delta file stored in said master repository.

7. The VHD file manager system of claim 6, wherein said stored VHD list comprises stored VHD identification, leaf file location and leaf file signature information.

8. The VHD file manager system of claim 1, wherein said deployment meta information comprises deployed VHD identification and set of files (SOF) information for each deployed VHD.

9. The VHD file manager system of claim 8, wherein said SOF information comprises signature and location information for each component file of a corresponding deployed VHD.

10. The VHD file manager system of claim 9, wherein said SOF information further comprises parent link and parent signature information associated with each said component file of a corresponding deployed VHD.

11. The VHD file manager system of claim 10, wherein said SOF information further comprises master link and master signature information for corresponding master component files stored in said master repository.

12. The VHD file manager system of claim 1, wherein said deployment agent manages re-deployment of a stored VHD in the server cloud including generation of a new leaf file linked to a prior leaf file of said re-deployed stored VHD.

13. The VHD file manager system of claim 1, wherein said deployment agent enables simultaneous deployment and use of a plurality of copies of a common VHD by managing creation of unique leaf files for each of said plurality of copies of said common VHD.

14. The VHD file manager system of claim 1, wherein said repository and deployment agents collectively enable selection from among said stored VHDs.

15. A virtual hard drive (VHD) file manager system for a virtualized logical server cloud that interfaces virtualization software and a server cloud manager to manage VHDs for logical servers of the server cloud, comprising:
   a master repository that stores a plurality of master component files associated with at least one stored VHD, said plurality of master component files including at least one core file and at least one delta file; and
   a VHD file manager that enables copying of said master component files to deploy VHDs in the server cloud, that manages creation and storing of new delta files and corresponding VHDs in said master repository, and that generates and maintains meta information to maintain file relationship integrity between deployed and master component files; and a repository agent that generates and manages master meta information for maintaining integrity of said plurality of master component files stored in said master repository, and that tracks identity of stored VHDs and links said stored VHDs with said plurality of master component files.

16. The VHD file manager system of claim 15, wherein said master meta information comprises a core file list and a delta file list each including a list of signatures and location information for each master core file and master delta file, respectively.

17. The VHD file manager system of claim 16, wherein said delta file list further comprises parent links and parent signature information for each master delta file.

18. The VHD file manager system of claim 15, wherein said master meta information further comprises a stored VHD list including a VHD identification list, a corresponding leaf file location list, and a corresponding leaf signature list.

19. The VHD file manager system of claim 15, wherein said VHD file manager further comprises a deployment agent that facilitates deployment of VHDs in the server cloud by cooperating with said repository agent to copy master component files from said master repository, that generates and manages deployment meta information of VHDs deployed in the server cloud, and that cooperates with said repository agent to manage storage of VHDs and corresponding component files into said master repository.

20. The VHD file manager system of claim 19, wherein said deployment meta information comprises a deployed VHD list including a list of VHD identities and corresponding component file information.

21. The VHD file manager system of claim 20, wherein said corresponding component file information comprises a component signature list and a component location list.

22. The VHD file manager system of claim 21, wherein said corresponding component file information further comprises a parent link list and a parent signature list.

23. The VHD file manager system of claim 22, wherein said corresponding component file information further comprises a master link list and a master signature list.

24. The VHD file manager system of claim 15, wherein said VHD file manager manages generation of a new leaf file linked to a copy of an existing VHD to form a new and related VHD.

25. The VHD file manager system of claim 15, wherein said VHD file manager enables simultaneous deployment and use of a plurality of copies of a stored VHD by managing creation of unique leaf files for each of said plurality of copies of said stored VHD.

26. The VHD file manager system of claim 15, wherein said VHD file manager enables an entity associated with the server cloud to select from among said plurality of stored VHDs.

27. The VHD file manager system of claim 15, wherein said master repository is distributed among host servers of a server cloud.

28. A method of managing virtual hard drives (VHDs) of logical servers of a virtualized logical server cloud, comprising:

storing each component file of at least one VHD created in the server cloud including a last leaf file; and generating and managing master meta information to identify each stored VHD and the corresponding component files and their relationships; and copying component files of a stored VHD to enable deployment of the stored VHD in the server cloud;

deploying a new VHD by creating a new leaf file linked to a last leaf file of the copied VHD to store differencing information associated with use of the copied VHD;

storing the new VHD including storing the new leaf file; and updating the master meta information to identify the new VHD with the new leaf file and to link the new leaf file to the last leaf file.

29. The method of claim 28, wherein said generating and managing master meta information includes, for each differencing file, storing a signature, a location, a parent link, and a parent signature.

30. The method of claim 28, wherein said copying component files of a stored VHD includes, for each differencing file, locating a parent file and comparing the signature of the parent file with a parent signature stored with the differencing file.

31. The method of claim 28, further comprising determining whether the last leaf file of a stored VHD copied into the server cloud is a parent file of another differencing file.

32. The method of claim 28, wherein said storing the new VHD and updating the meta information includes adding an entry to a stored VHD list including a new VHD identification, a location of the stored new leaf file, and a copy of a signature of the new leaf file.

33. The method of claim 28, wherein said storing the new VHD and updating the master meta information includes comparing a signature of each deployed component file of the new VHD with a signature of a corresponding stored component file.

34. The method of claim 28, further comprising generating and managing deployed meta information to identify each deployed VHD and its corresponding component files.

35. The method of claim 34, wherein said generating and managing deployed meta information includes generating a VHD identifier and a corresponding set of files record.

36. The method of claim 35, wherein said generating a corresponding set of files record includes generating a component file signature, a component file location, a parent link and a parent signature.

37. The method of claim 36, wherein said generating a corresponding set of files record further comprises generating a master link and a corresponding master signature.

38. The method of claim 28, wherein said copying component files of a stored VHD comprises copying a plurality of each component file to generate multiple copies of the stored VHD in the server cloud and creating a new leaf file for each VHD copy.

* * * * *